United States Patent [19]

Ziegler

[11] Patent Number: 4,770,624

[45] Date of Patent: Sep. 13, 1988

[54] VERTICAL PARISON EXTRUDERS FOR BLOW MOLDING MACHINES

[76] Inventor: William E. Ziegler, 2570 Coachlite, Tecumseh, Mich. 49286

[21] Appl. No.: 907,896

[22] Filed: Sep. 16, 1986

Related U.S. Application Data

[63] Continuation-in-part of Ser. No. 592,518, Mar. 23, 1984, abandoned.

[51] Int. Cl.$^4$ .............................................. B29C 47/22
[52] U.S. Cl. .................... 425/208; 264/209.8; 264/540; 425/376 A; 425/466; 425/532; 425/382.4
[58] Field of Search ............... 425/532, 191, 192 R, 425/531, 208, 381, 376 A, 376 B, 466, 467, 540, 541, 155; 264/540, 541, 209.2, 543, 209.8

[56] References Cited

U.S. PATENT DOCUMENTS

| | | | |
|---|---|---|---|
| 2,676,356 | 4/1954 | Becker | 425/381 |
| 3,002,615 | 10/1961 | Lemelson | 425/155 |
| 3,021,561 | 2/1962 | Reifenhauser | 425/208 |
| 3,281,896 | 11/1966 | Meyer et al. | 425/466 |
| 3,327,038 | 6/1967 | Fox | 425/466 X |
| 3,355,769 | 12/1967 | Fogelberg | 425/466 X |
| 3,387,331 | 6/1968 | Billings | 264/209.2 |
| 3,583,033 | 6/1971 | Christofas et al. | 425/381 |
| 3,614,807 | 10/1971 | Lagoutte | 264/543 |
| 3,689,182 | 9/1972 | Kovacs | 425/208 |
| 3,690,798 | 9/1972 | Raspante | 425/381 |
| 3,870,451 | 3/1975 | Gokcen | 425/381 |
| 3,970,418 | 7/1976 | Turek | 425/531 X |
| 4,022,603 | 5/1977 | Roeder et al. | 425/381 |
| 4,171,195 | 10/1979 | Klein et al. | 425/467 X |
| 4,362,683 | 12/1982 | Otsuka et al. | 425/376 A X |
| 4,365,946 | 12/1982 | Anders | 425/376 B X |
| 4,432,718 | 2/1984 | Wurzer | 425/466 |
| 4,450,131 | 5/1984 | Martinek | 264/209.2 |
| 4,530,605 | 7/1985 | Eichlseder et al. | 425/376 A X |

Primary Examiner—Richard L. Chiesa
Attorney, Agent, or Firm—James M. Deimen

[57] ABSTRACT

A vertical plastic parison extruder with a relatively short vertical height and an adjustable choke between the extrusion screw and the extrusion die. The choke, in combination with a vertically moveable mandrel extending into the extrusion die, frictionally dissipates the rotational component of the moving viscous plastic between the extrusion screw and the exit of the extrusion die. The relatively short length and large diameter of the extrusion screw permits the moveable mandrel to extend through the extrusion screw and eliminates the need for lateral support of the extrusion screw and mandrel below the material feed entrance to the extrusion screw. The extrusion screw length to diameter ratio is adjusted to provide the same residence time for plasticizing the feed material as with the normally smaller diameter and longer extrusion screws.

16 Claims, 4 Drawing Sheets

VERTICAL PARISON EXTRUDERS FOR BLOW MOLDING MACHINES

This is a continuation-in-part of copending application Ser. No. 592,518 filed on Mar. 23, 1984, now abandoned.

BACKGROUND OF THE INVENTION

The field of the invention pertains to vertical extruders for extruding plastic parisons in conjunction with almost all types of blow molding machines including multistation indexable rotary table blow molding machines for the molding of plastic bottles and the like. In particular, the invention pertains to improvements in the vertical extruder to provide a smoother path for the extruded material and a shortened extruder length.

Vertical extruders commonly comprise a rotatable extrusion screw located within a hollow tube. The extrusion die for forming the parison is located at the lower end of the extrusion tube and includes a fixed or vertically movable central mandrel to produce a hollow plastic tube or parison. At the upper end of the extrusion tube and rotatable extrusion screw is an inlet for feeding raw plastic material, typically in pellet form, to the extrusion screw. The extruder is usually heated. The rotational motion of the screw in conjunction with the heat plasticizes the pellets into a highly viscous fluid material which is thereupon squeezed out through the extrusion die to form the parison.

The typical parison extrusion screw and extrusion tube is a substantially tall device of relatively small diameter exceeding a length to diameter ratio of twenty. To support and move the central mandrel, lateral support and actuation means extend from the inside wall of the extrusion tube to the mandrel at a location above the extrusion die and below the extrusion screw. Unfortunately, such lateral support and actuation means, sometimes called a spider, interferes with the movement of the highly viscous plastic material from the screw toward the extrusion die. The spider adds substantial resistance to the flow of the material and with some plastic materials can cause unsightly burn spots in the products manufactured by the blow molding machine. The burn spots are caused by particles of resin which are caught on the entrance or exit surfaces of the spider and therefore fail to flow smoothly with the resin.

Typically, the spider in the passageway between the lower end of the extrusion screw and the exit of the the extrusion die frictionally eliminates the rotating component of the viscous plastic prior to exit from the extrusion die. Thus, the rotating component of the viscous plastic is reduced to a negligible amount in the parison as it exits the die to prevent malformation of the parison as the mold cavity of the blow molding machine closes about the parison.

SUMMARY OF THE INVENTION

The invention comprises improvements to vertical parison extruders for plastic materials used in conjunction with blow molding machines for blowing bottles and the like. It is an object of the invention to provide a relatively short extrusion screw and extrusion tube with a low length to diameter ratio relative to conventional parison extruders. It is also an object of the invention to eliminate the need for lateral support means below the plastic material feed entrance to the extrusion screw, thereby eliminating obstructions in the flow path and unnecessary resistance to the flow of the viscous plastic exiting the extrusion screw. The relatively low length to diameter ratio of the extrusion screw permits an axially moveable mandrel support to extend through a hollow passage down the center of the extrusion screw. The mandrel can thereby be axially actuated by a programmable controller connected to the machine for adjustment of the parison wall thickness as it extrudes from the extrusion die.

An adjustable choke comprising an internal sleeve located in the internal passage of the extruder below the extrusion screw controls the frictional resistance on the viscous plastic material. Normally the choke is adjusted such that the rotational component of the movement of the viscous plastic exiting the extrusion screw becomes negligible at the exit of the extrusion die. The choke sleeve is axially adjustable through means extending externally through the wall of the extruder between the extrusion die and the lower end of the extrusion screw. In modifying the length to diameter ratio of the extrusion screw, the diameter and pitch of the extrusion screw is adjusted such that the residence time of the plastic within the extrusion screw remains the same as that within a much longer, smaller diameter extrusion screw.

The improvements include two other features that permit the extruder to be operated in a "continuous" mode, i.e., without altering the rotational speed of the extrusion screw. These features prevent the forming parison from interfering with molds and tie bars on the adjacent blow molding machine.

Firstly, the extruder is mounted on a vertically reciprocating frame. Secondly, the mandrel controller is programmed to completely close the die gap with the mandrel to thereby sever the extruding parison from the die at the appropriate moment in the molding cycle. Either or both means can be used to assure that the extruding parison does not contact the molds and tie bars as they index into and out of position beneath the extrusion die.

DETAILED DESCRIPTION OF THE PREFERRED EMBODIMENT

Figure 1:
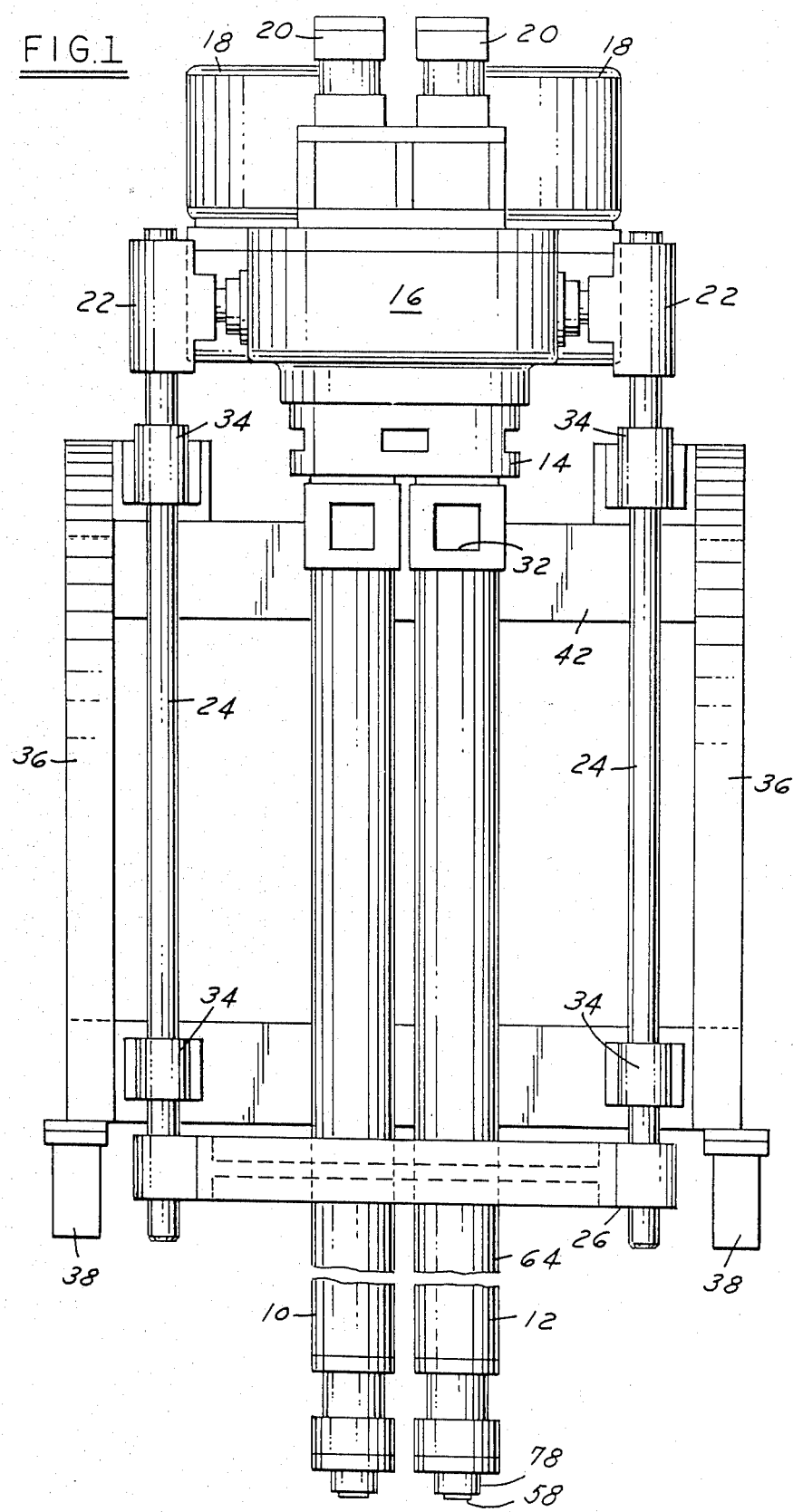
FIG. 1 is a side view of a pair of vertical extruders.
Figure 2:
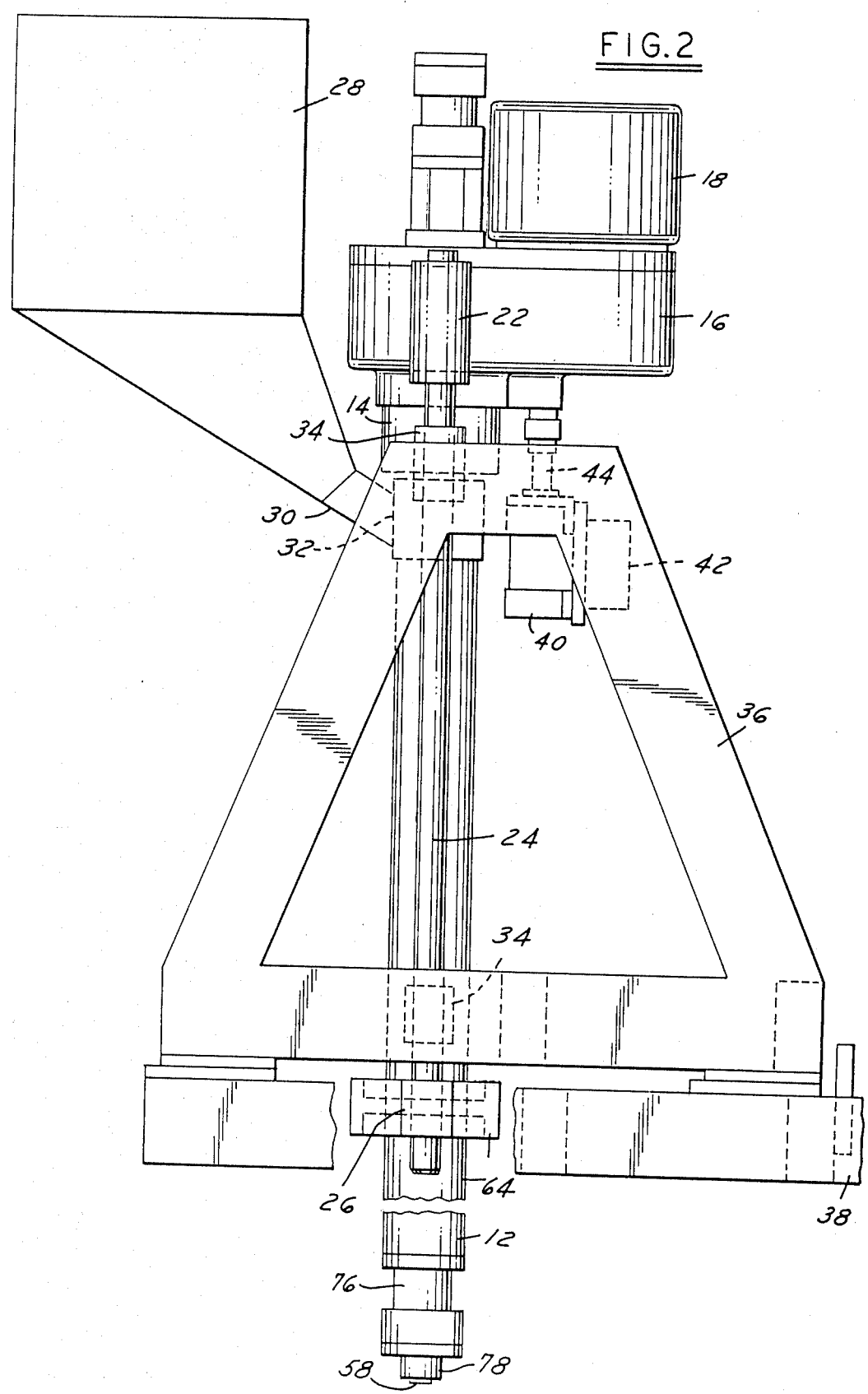
FIG. 2 is an end view of the pair of extruders shown in FIG. 1.
Figure 3:
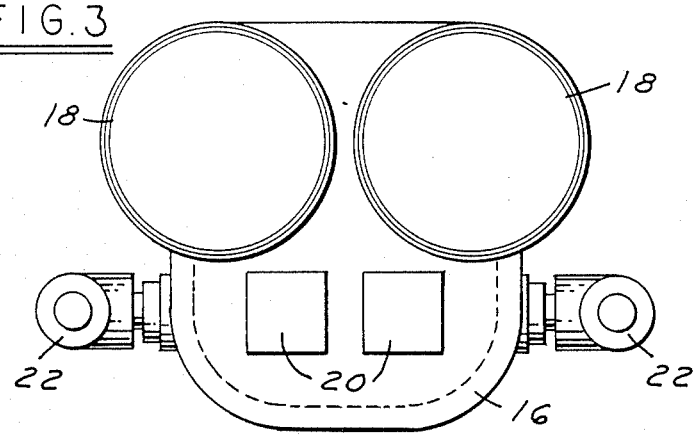
FIG. 3 is a partial top view of the extruders shown in FIGS. 1 and 2.

In FIGS. 1, 2 and 3 a pair of vertical extruders 10 and 12 extend downwardly from support means 14 in turn supported by a gear box 16. The pair of extruders are typically used for extruding simultaneously two parisons for double cavity molds in a blow molding machine. Atop the gearbox 16 are a pair of motors 18 for rotationally driving the extrusion screws within the extruders 10 and 12. Also atop the gearbox are a pair of hydraulic cylinders 20 for vertically actuating mandrels within the extruders. The entire extruder and drive train assembly above is supported on a moveable frame 22 having vertical rods 24 extending downwardly to a supporting cross member 26 in engagement with the extruders 10 and 12.

As best shown in FIG. 2, pellet hoppers 28 feed through a funnel 30 into the entrance 32 of each extruder. The extruder and hopper structure described above is laterally supported by four sliding supports 34 guiding the vertical rods 24. The supports 34 are mounted on a fixed frame 36 in turn attached to the top 38 of the blow molding machine. The hydraulic cylinder 40 is attached to the frame cross brace 42 with the piston rod 44 extending upwardly and attached to the bottom of the gearbox 16. Actuation of the hydraulic cylinder 40 causes the moveable assembly, including the twin extruders 10 and 12, to move upwardly carrying the continuously extruding parisons with the extruders. This feature permits continuously extruding parisons to be raised or lowered at appropriate moments during the extrusion cycle. Thus, the lower ends of the parisons can be raised to clear the mold and tie bar portion of a clamp assembly as the clamp assembly indexes into or out of the extrusion station.

Figure 4:
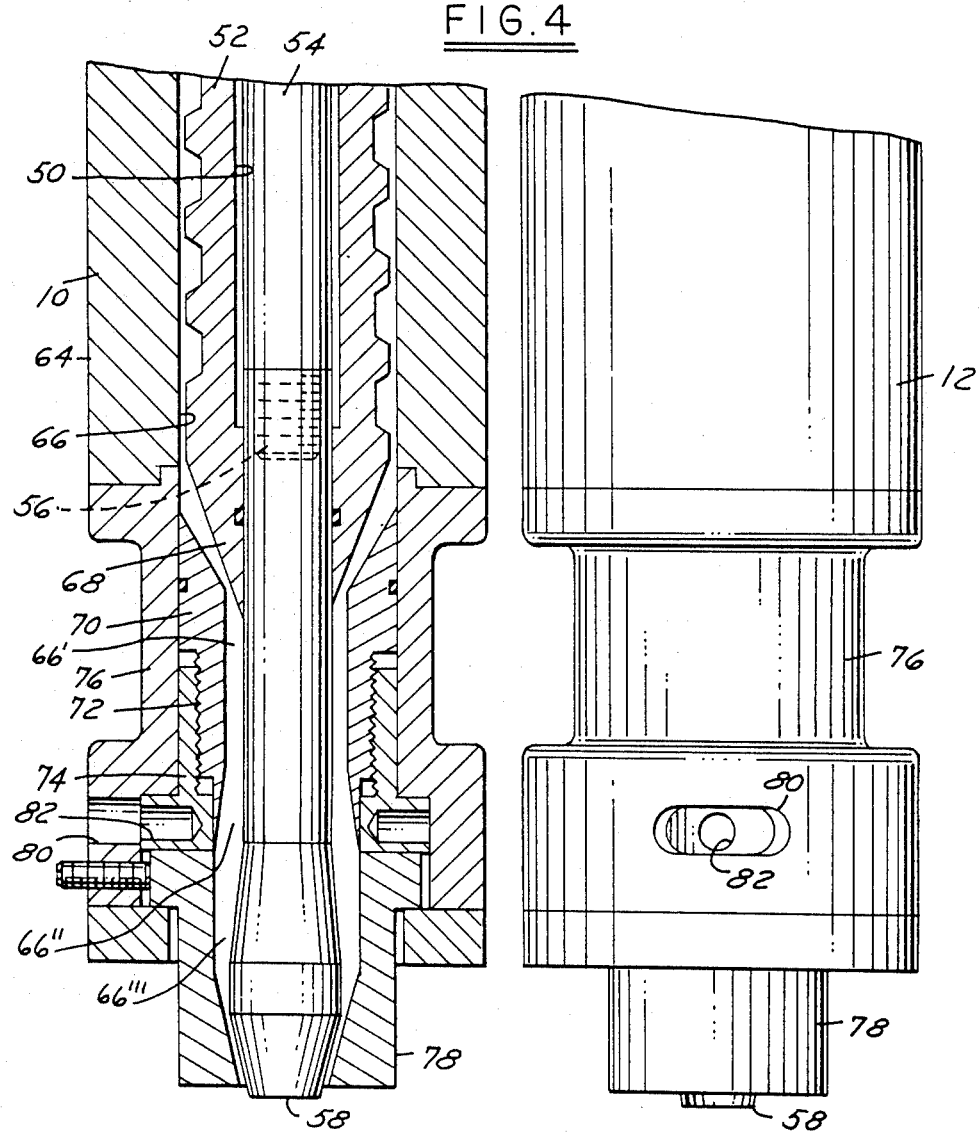
FIG. 4 is a partial cutaway lower side view including a cross section of one of the pair of extruders shown in FIG. 1.
Figure 5:
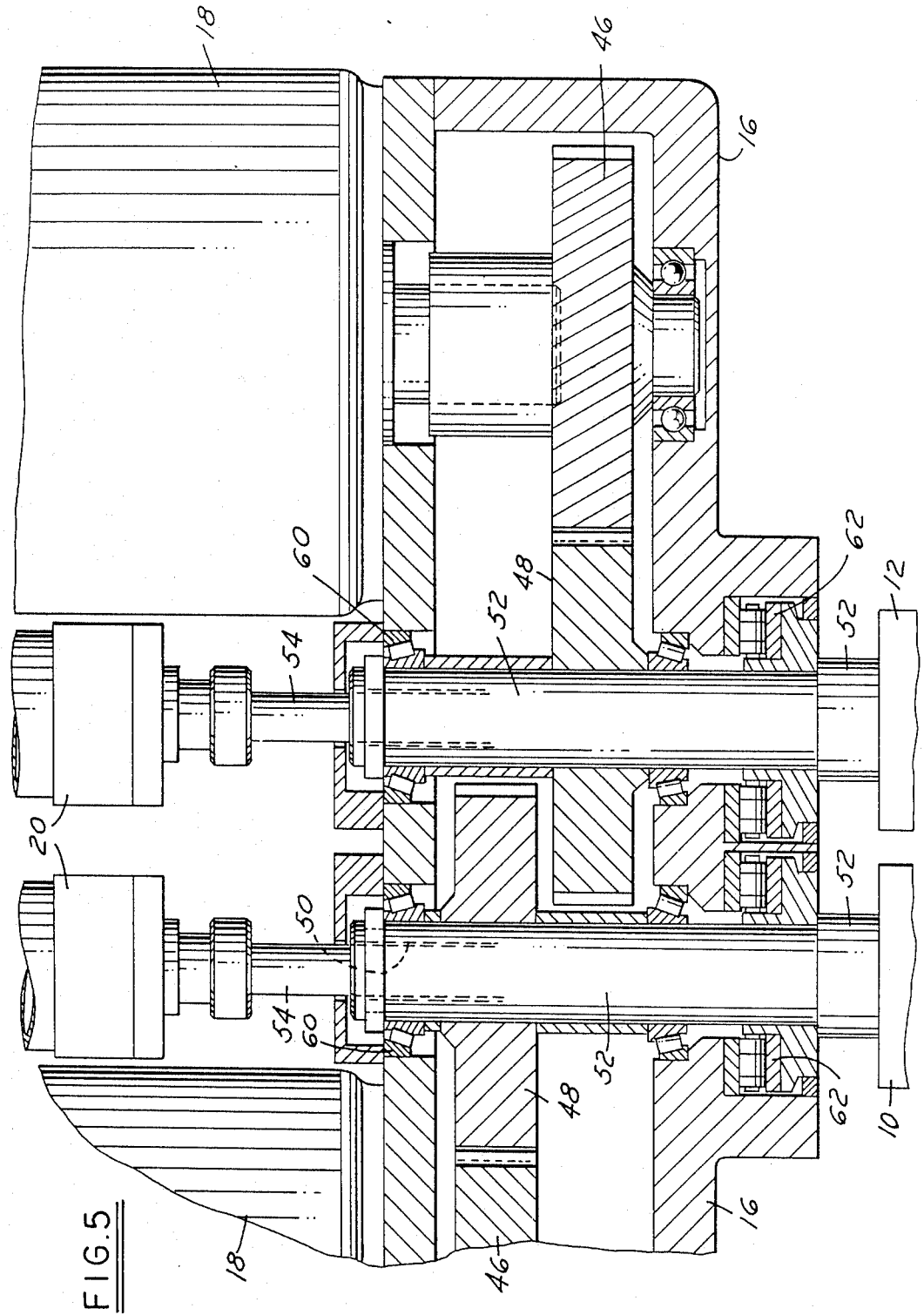
FIG. 5 is a partial cutaway upper side view including a cross section of the extruder drive.

As best shown in FIGS. 4 and 5 the gearbox 16 includes therein a drive gear 46 attached to each motor 18 and in engagement with a driven gear 48 for each extruder 10 and 12. The driven gears 48 each are attached to and rotate vertical extrusion screws 52 within each extruder. The extrusion screws 52 include axial bores 50. Within the bores 50 and screws 52 are vertically moveable mandrel supports 54 connected at their upper ends to the pistons of the hydraulic cylinders 20. At the lower end of each of the mandrel supports 54 is a threaded engagement 56 with the mandrel 58. The extrusion screws 52 are supported by roller bearings 60 within the gearbox 16. At the bottom of the gearbox 16 a thrust bearing 62 for each extrusion screw 52 absorbs the upward thrust of the screw.

The extrusion screw 52 is located within the extrusion tube 64 bore 66 forming a very narrow circumferential clearance about the screw in which the plastic material, typically solid pellets, poured into the hopper 28 and fed into the extruder, is heated and plasticized into a highly viscous fluid material.

At the lower end 68 of the extrusion screw 52 the bore or passage 66 is narrowed about the mandrel 58 as shown. The narrowing of the passage is created by a choke sleeve 70 about the mandrel and end of the extruder screw. The choke sleeve 70 is threaded at 72, the threads being in engagement with a rotatable collar 74 in turn within an extension 76 of the extruder tube 64. Within the extension 76 and choke sleeve 70 the passage 66 again broadens as shown at 66' and 66''. Attached below the extension 76 is the extrusion die 78. As shown, within the extrusion die 78 the broadened passage again narrows at 66''' to the die exit. Other configurations of extrusion die and mandrel tip may be substituted for the die 78 which is shown as an example.

Slots 80 are formed in the extension 76 to permit access to holes 82 in the collar 74. Thus, the choke sleeve can be moved axially short distances as necessary to adjust the size of the flow passage about the end of the extrusion screw 68 by turning the collar 74 from outside the extruder. The choke sleeve 70 is adjusted such that the parison extruding from the die 78 has a negligible rotational component. Typically, the largest die opening in the molding cycle as determined by the maximum upward position of the mandrel 58 will determine the choke sleeve setting.

Thus, the frictional resistance of the viscous plastic material moving past the choke sleeve 70 can be adjusted conveniently with the extrusion screw 52 in operation. It may be noted that by suspending the extrusion screw 52 and mandrel 58 entirely from the gearbox 16 and supporting the gear box 16 and extruder tubes 64 on the moveable frame, lateral support means between the tube 64 and the extrusion screw 52 below the thrust bearing 62 is not required and obstructions in the passage 66 are eliminated.

I claim:

1. An extruder for the forming of parisons comprising an elongated hollow tube, a rotatable extrusion screw axially located in the hollow tube and having an inlet and an outlet end, an extrusion die located adjacent one end of the tube and having an opening therethrough with an entrance to and exit from the die, and a mandrel within the die movably cooperable with the die exit,
   an internal choke located axially adjacent the outlet end of the extrusion screw to remove the rotational component from the material extruding from the extrusion screw, said choke surrounding the mandrel between the die opening entrance and the extrusion screw to form a substantially narrowed passageway downstream of the extrusion screw,
   a substantially radially broadened pasageway downstream from the internal choke and upstream of the extrusion die entrance, and
   adjustment means engaging the choke for selective axial positioning of the choke relative to the mandrel and the extrusion screw, said adjustment means for the choke independent of any means for axially adjusting the die relative to the mandrel or the hollow tube, said adjustment means including externally engageable means to provide for axial adjustment of the choke from the outside of the extruder.

2. The extruder of claim 1 wherein said rotatable extrusion screw and mandrel are supported adjacent the inlet end of the extrusion screw, said screw and mandrel being radially unsupported by means external thereto downstream from said inlet end.

3. The extruder of claim 1 including means for axially moving the mandrel within the die.

4. The extruder of claim 3 wherein the mandrel and means for axially moving the mandrel are actuatable in response to cyclic programmed instructions.

5. The extruder of claim 1 including vertical reciprocating means in engagement with the extruder and actuatable to raise and lower the extruder and parison extruding therefrom.

6. The extruder of claim 1 wherein the choke is axially adjusted relative to the extrusion screw to a position wherein the frictional resistance of the choke in contact with the material extruding from the outlet of the extrusion screw causes the rotational component of the extruding material to be substantially negligible as the parison exits the die.

7. The vertical extruder of claim 1 wherein the adjustment means includes a rotatable collar threadably engaging the choke, said collar including means for external engagement therewith.

8. The extruder of claim 1 wherein the mandrel is axially moveable relative to the extrusion screw.

9. A vertical extruder for the forming of parisons comprising a vertical elongated hollow tube, a hollow rotatable extrusion screw axially located in the hollow tube and having an inlet end and an outlet end, a passageway in the hollow tube below the outlet end of the extrusion screw, an extrusion die located adjacent the lower end of the tube and having an opening therethrough with an entrance to and an exit from the die, a mandrel within the die movably cooperable with the die exit, said mandrel extending axially into the hollow extrusion screw, an internal choke separate from said mandrel, extrusion screw and die located below said extrusion screw and above the opening entrance to said die to remove the rotational component from the material extruding from the extrusion screw, said separate internal choke surrounding the mandrel between the die opening entrance and the extrusion screw sequentially narrowing and then radially broadening the passageway below the outlet end of the extrusion screw and upstream of the die opening entrance, and means for axially moving the mandrel within the die and extrusion screw, said mandrel and extrusion screw being vertically and laterally supported above the inlet end of said extrusion screw and being without lateral support below the inlet end of the extrusion screw.

10. The vertical extruder of claim 9 wherein the choke is axially adjusted relative to the extrusion screw to a position wherein the frictional resistance of the choke in contact with the material extruding from the outlet of the extrusion screw causes the rotational component of the extruding material to be substantially negligible as the parison exits the die.

11. The vertical extruder of claim 9 including adjustment means engaging the choke for selective axial positioning of the choke, said adjustment means including externally engageable means to provide for axial adjustment of the choke from outside of the extruder.

12. The vertical extruder of claim 11 wherein the adjustment means incldes a rotatable collar threadably engaging the choke, said collar including means for external engagement therewith.

13. The vertical extruder of claim 9 including vertical reciprocating means in engagement with the extruder and actuatable to raise and lower the extruder and parison extruding therefrom.

14. The vertical extruder of claim 9 wherein the mandrel and means for axially moving the mandrel are actuatable in response to cyclic programmed instructions.

15. A vertical extruder for the forming of parisons comprising an elongated hollow tube, a rotatable substantially cylindrical extrusion screw axially located in the hollow tube and having an inlet end and an outlet end, an axial bore through the extrusion screw, an extrusion die located adjacent one end of the tube and having an opening therethrough with an entrance and an exit, a mandrel extending within the die, means for axially moving the mandrel within the die, said means for axially moving the mandrel extending through the axial bore to support the mandrel and said mandrel being moveable into at least momentary contact with the die to close the die opening and thereby sever the parison extruding through the die opening, means entirely above the inlet end of the extruder to support the extrusion screw, the mandrel and the means for axially moving the mandrel, said extrusion screw, said means for axially moving the mandrel and the mandrel being radially unsupported below the inlet end, an internal choke located axially adjacent the outlet end of the extrusion screw to remove the rotational component from the material extruding from the extrusion screw, said choke surrounding the mandrel between the extrusion screw and the die opening entrance constricting the passageway between the extrusion screw and the opening entrance to the die, a substantially radially broadened passageway downstream from the choke and upstream of the die opening entrance, and vertical reciprocating means in engagement with the extruder and actuatable to raise and lower the extruder and parison extruding therefrom, said movement of the mandrel to sever the parison coordinated with the raising of the extruder to momentarily separate and space the extruder from the just previously extruded parison.

16. The vertical extruder of claim 15 in combination with an indexable rotary table blow molding machine, means to drive the vertical extruder continuously and means to cyclically close the die opening with the mandrel to sever the parison and to cyclically actuate the vertical reciprocating means prior to indexing of a closed mold from the extruder station.

* * * * *